United States Patent
Kumar et al.

(10) Patent No.: US 8,972,351 B1
(45) Date of Patent: Mar. 3, 2015

(54) SYSTEMS AND METHODS FOR CREATING SELECTIVE SNAPSHOTS

(75) Inventors: Sanjay Kumar, Pune (IN); Subash Rajaa, Pune (IN)

(73) Assignee: Symantec Corporation, Mountain View, CA (US)

(*) Notice: Subject to any disclaimer, the term of this patent is extended or adjusted under 35 U.S.C. 154(b) by 384 days.

(21) Appl. No.: 13/291,692

(22) Filed: Nov. 8, 2011

(51) Int. Cl.
   *G06F 17/30* (2006.01)
(52) U.S. Cl.
   USPC ........................................... 707/639
(58) Field of Classification Search
   USPC ........................................... 707/639
   See application file for complete search history.

(56) References Cited

U.S. PATENT DOCUMENTS

2004/0181642 A1* 9/2004 Watanabe et al. ............. 711/162
2004/0260673 A1* 12/2004 Hitz et al. ......................... 707/1

* cited by examiner

*Primary Examiner* — Hosain Alam
*Assistant Examiner* — Johnese Johnson
(74) *Attorney, Agent, or Firm* — ALG Intellectual Property, LLC

(57) ABSTRACT

A computer-implemented method for creating selective snapshots may include (1) determining that a snapshot has been taken of a volume of data that includes at least one file, (2) identifying a first attempted modification to a first block of the file, (3) determining, based on a block map of the file, that the first block falls within a scope of the snapshot, (4) copying the first block before the first attempted modification for use in the snapshot, (5) identifying a second attempted modification to a second block of the file, (6) determining, based on the block map of the file, that the second block does not fall within the scope of the snapshot, and (7) allowing the second attempted modification without first copying the second block for use in the snapshot. Various other methods, systems, and computer-readable media are also disclosed.

20 Claims, 7 Drawing Sheets

SYSTEMS AND METHODS FOR CREATING SELECTIVE SNAPSHOTS

BACKGROUND

Organizations increasingly generate and use large amounts of data. In the course of managing its data, an organization may wish to back up this data while maintaining uninterrupted access to the same. Creating a consistent backup may involve backing up all data within a backup reflecting the state of the backed-up data at a given point in time. In order to provide a consistent backup of a volume of data (as well as uninterrupted access to write to the volume), a backup system may utilize a copy-on-write snapshot.

Traditional technologies may create a copy-on-write snapshot of a volume by making a copy of a block of data on the volume whenever that block of data is about to be overwritten. Attempts to read from the snapshot may then be either directly fulfilled from the volume (if the corresponding block on the volume has not changed since the snapshot) or fulfilled from a copied block of data created for the snapshot.

Unfortunately, performing a copy-on-write operation for every changed block may consume a significant amount of computing resources, potentially taxing input/output ("I/O") performance and consuming storage space. Accordingly, the instant disclosure identifies a need for additional and improved systems and methods for creating selective snapshots.

SUMMARY

As will be described in greater detail below, the instant disclosure generally relates to systems and methods for creating selective snapshots by determining which portions of files are important (e.g., the semantically and/or logically important portions of the files) and only preserving those portions of the files in snapshots. In one example, a computer-implemented method for creating selective snapshots may include (1) determining that a snapshot has been taken of a volume of data, the volume of data including at least one file, (2) identifying a first attempted modification to a first block of the file, (3) determining, based on a block map of the file, that the first block falls within a scope of the snapshot, (4) in response to determining that the first block falls within the scope of the snapshot, copying the first block before the first attempted modification for use in the snapshot, (5) identifying a second attempted modification to a second block of the file, (6) determining, based on the block map of the file, that the second block does not fall within the scope of the snapshot, and (7) in response to determining that the second block does not fall within the scope of the snapshot, allowing the second attempted modification without first copying the second block for use in the snapshot.

In some examples, the file may include a virtual disk file. In these examples, determining that the first block falls within the scope of the snapshot may include any of a variety of steps. For example, determining that the first block falls within the scope of the snapshot may include (1) identifying a plurality of in-scope files stored within the virtual disk file that fall within the scope of the snapshot, (2) identifying a plurality of in-scope blocks of the virtual disk file corresponding to the plurality of in-scope files, and (3) modifying the block map to reflect that the plurality of in-scope blocks fall within the scope of the snapshot. In this example, identifying the plurality of in-scope blocks corresponding to the plurality of in-scope files may include, for each in-scope file within the plurality of in-scope files, (1) locating, within the virtual disk file, an inode corresponding to the in-scope file, and (2) identifying each block referenced by the inode.

In some embodiments, determining that the second block does not fall within the scope of the snapshot may include determining, based on the block map of the file, that the second block represents an unallocated block within the virtual disk file. Additionally or alternatively, determining that the second block does not fall within the scope of the snapshot may include determining, based on the block map of the file, that the second block represents a block within a temporary file within the virtual disk file.

In some examples, the file may include a database file. In these examples, determining that the first block falls within a scope of the snapshot may include determining, based on the block map of the file, that the first block represents a portion of a database table that falls within the scope of the snapshot.

In one embodiment, a system for implementing the above-described method may include (1) a snapshot module programmed to determine that a snapshot has been taken of a volume of data, the volume of data including at least one file, (2) an identification module programmed to (i) identify a first attempted modification to a first block of the file, and (ii) identify a second attempted modification to a second block of the file, (3) a determination module programmed to (i) determine, based on a block map of the file, that the first block falls within a scope of the snapshot and (ii) determine, based on the block map of the file, that the second block does not fall within the scope of the snapshot, and (4) a copying module programmed to (i) in response to determining that the first block falls within the scope of the snapshot, copy the first block before the first attempted modification for use in the snapshot, and (ii) in response to determining that the second block does not fall within the scope of the snapshot, allow the second attempted modification without first copying the second block for use in the snapshot. The system may also include at least one processor configured to execute the snapshot module, the identification module, the determination module, and the copying module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) determine that a snapshot has been taken of a volume of data, the volume of data including at least one file, (2) identify a first attempted modification to a first block of the file, (3) determine, based on a block map of the file, that the first block falls within a scope of the snapshot, (4) in response to determining that the first block falls within the scope of the snapshot, copy the first block before the first attempted modification for use in the snapshot, (5) identify a second attempted modification to a second block of the file, (6) determine, based on the block map of the file, that the second block does not fall within the scope of the snapshot, and (7) in response to determining that the second block does not fall within the scope of the snapshot, allow the second attempted modification without first copying the second block for use in the snapshot.

As will be explained in greater detail below, by determining which portions of files are important (e.g., the semantically and/or logically important portions of the files) and only preserving those portions of the files in snapshots, the systems and methods described herein may improve the efficiency of snapshots by avoiding unnecessary I/O operations and storage consumption. Furthermore, in some examples, these systems and methods may improve the efficiency of subsequent operations based on the snapshot, such as backups, restorations, and replications, by providing a smaller snapshot to backup, restore, and/or replicate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
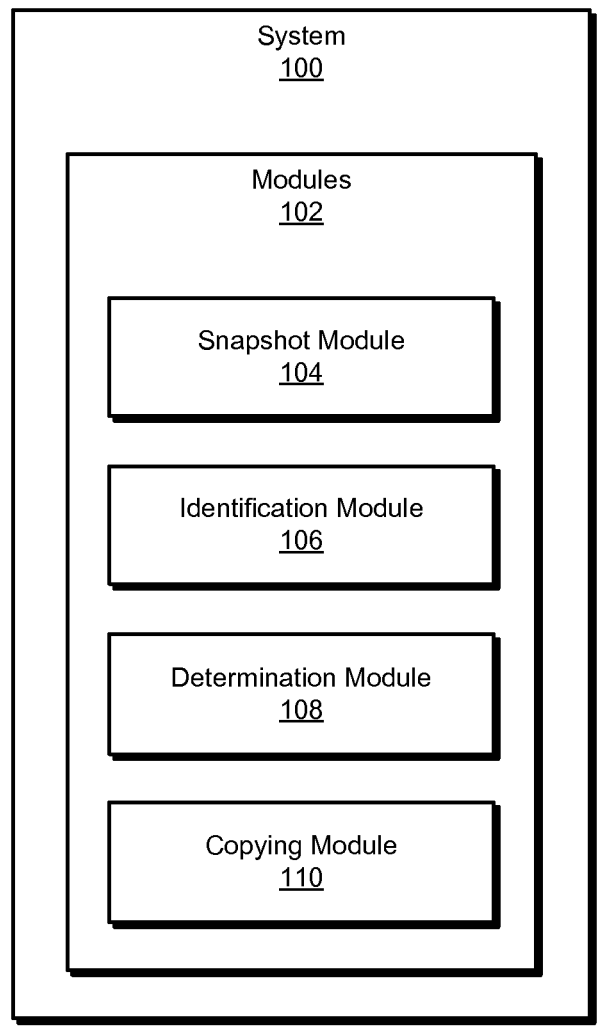
FIG. 1 is a block diagram of an exemplary system for creating selective snapshots.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
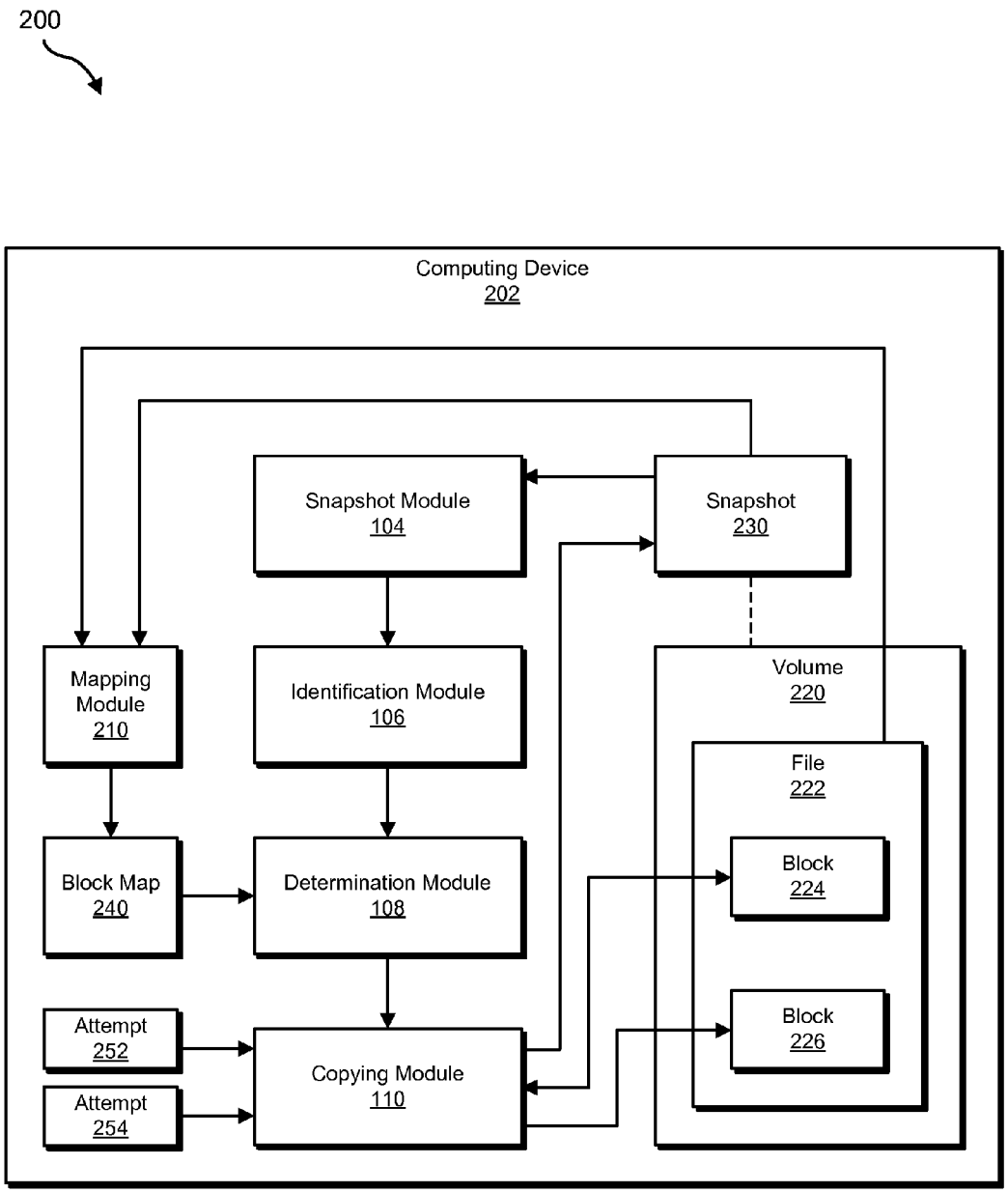
FIG. 2 is a block diagram of an exemplary system for creating selective snapshots.
Figure 3:
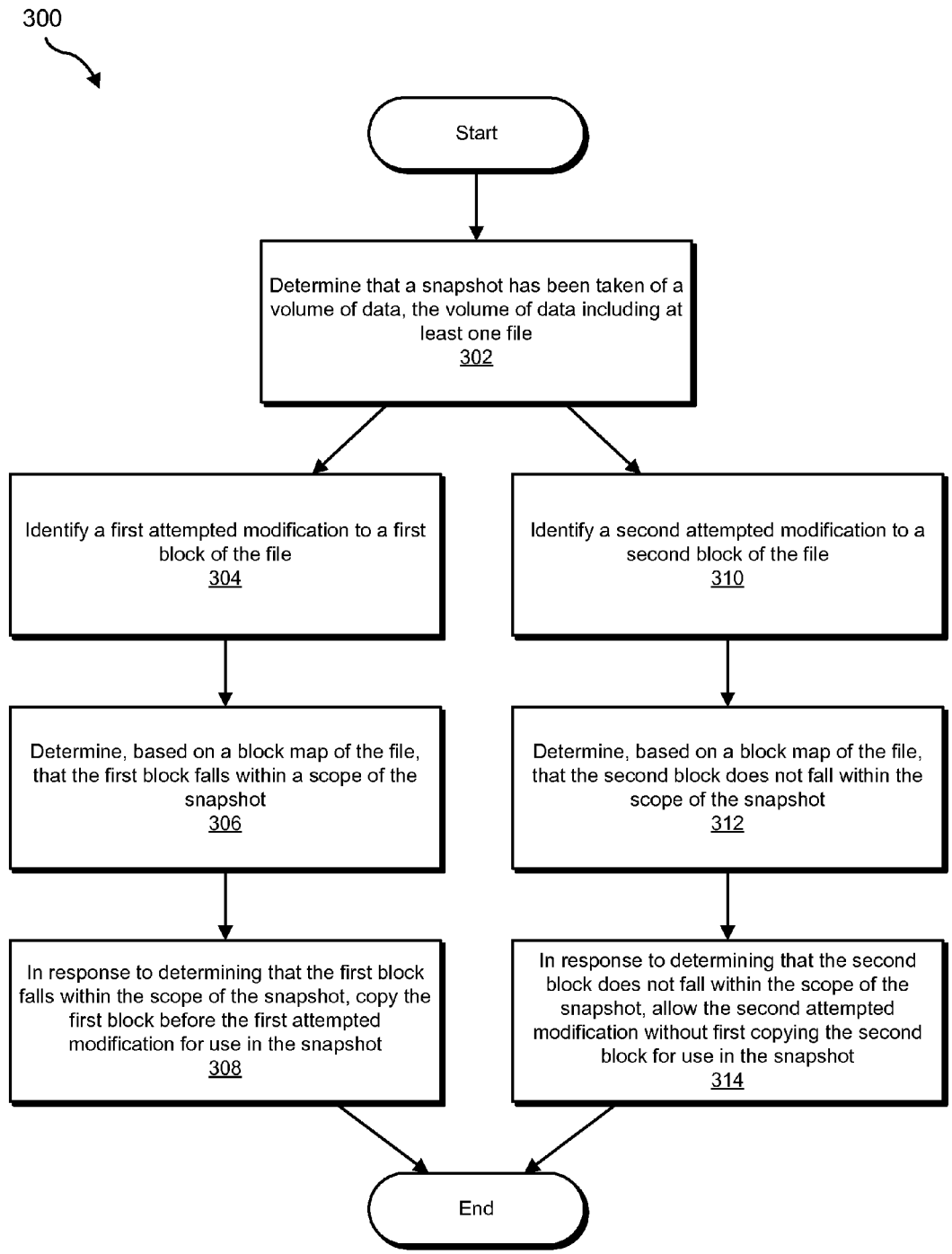
FIG. 3 is a flow diagram of an exemplary method for creating selective snapshots.
Figure 4:
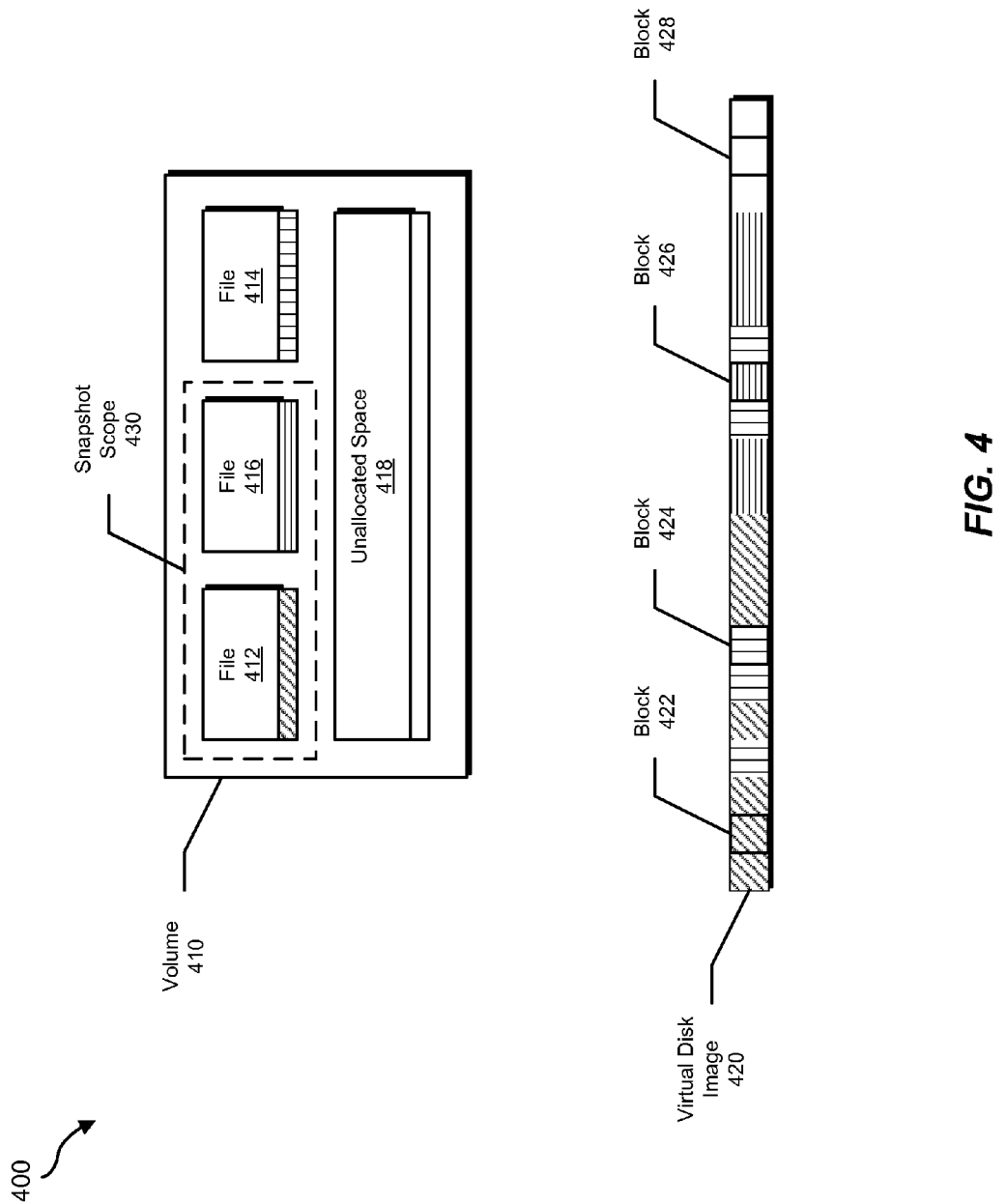
FIG. 4 is a block diagram of an exemplary system for creating selective snapshots.

The following will provide, with reference to FIGS. 1, 2, and 4, detailed descriptions of exemplary systems for creating selective snapshots. Detailed descriptions of corresponding computer-implemented methods will also be provided in connection with FIG. 3. Detailed descriptions of a corresponding exemplary inode structure will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for creating selective snapshots. As illustrated in this figure, exemplary system 100 may include one or more modules 102 for performing one or more tasks. For example, and as will be explained in greater detail below, exemplary system 100 may include a snapshot module 104 programmed to determine that a snapshot has been taken of a volume of data, the volume of data including at least one file. Exemplary system 100 may also include an identification module 106 programmed to (1) identify a first attempted modification to a first block of the file and (2) identify a second attempted modification to a second block of the file.

In addition, and as will be described in greater detail below, exemplary system 100 may include a determination module 108 programmed to (1) determine, based on a block map of the file, that the first block falls within a scope of the snapshot and (2) determine, based on the block map of the file, that the second block does not fall within the scope of the snapshot. Exemplary system 100 may also include a copying module 110 programmed to, in response to determining that the first block falls within the scope of the snapshot, (1) copy the first block before the first attempted modification for use in the snapshot, and, in response to determining that the second block does not fall within the scope of the snapshot, (2) allow the second attempted modification without first copying the second block for use in the snapshot. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 configured to take a snapshot 230 of a volume 220.

In one embodiment, one or more of modules 102 from FIG. 1 may, when executed by at least one processor of computing device 202, facilitate computing device 202 in creating selective snapshots. For example, and as will be described in greater detail below, one or more of modules 102 may cause computing device 202 to (1) determine that a snapshot (e.g., snapshot 230) has been taken of a volume of data (e.g., volume 220), the volume of data including at least one file (e.g., a file 222), (2) identify a first attempted modification (e.g., an attempt 252) to a first block of the file (e.g., a block 224 of file 222), (3) determine, based on a block map of the file (e.g., a block map 240 of file 222), that the first block falls within a scope of the snapshot (e.g., that block 224 falls within the scope of snapshot 230), (4) in response to determining that the first block falls within the scope of the snapshot, copy the first block before the first attempted modification for use in the snapshot (e.g., copy block 224 for use in snapshot 230 before allowing attempt 252), (5) identify a second attempted modification (e.g., an attempt 254) to a second block of the file (e.g., to a block 226 of file 222), (6) determine, based on the block map of the file, that the second block does not fall within the scope of the snapshot (e.g., determine, based on block map 240 of file 222, that block 226 does not fall within the scope of snapshot 230), and (7) in response to determining that the second block does not fall within the scope of the snapshot, allow the second attempted modification without first copying the second block for use in the snapshot (e.g., allow attempt 254 to change block 226 without first copying block 226 for use in snapshot 230).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

FIG. 3 is a flow diagram of an exemplary computer-implemented method 300 for creating selective snapshots. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may determine that a snapshot has been taken of a volume of data, the volume of data including at least one file. For example, at step 302 snapshot module 104 may, as part of computing device 202 in FIG. 2, determine that snapshot 230 has been taken of volume 220 including file 222.

As used herein, the phrase "volume of data" may refer to any collection of data. Examples of a volume of data include, but are not limited to, a database, a file system partition, a logical volume, and/or a selected group of files. In one example, the phrase "volume of data" may refer to a volume including a single file.

As used herein, the term "snapshot" may refer to any representation of a volume and/or a portion of a volume in a certain state and/or point in time. In some examples, a "snapshot" may refer to a space-saving snapshot (e.g., a snapshot that references a primary volume for unchanged data) and/or a copy-on-write snapshot (e.g., a snapshot that copies protected data as it existed at the time of the snapshot before overwriting the protected data in order to preserve a point-in-time copy of the data). In some examples, the snapshot may include a block-level snapshot (e.g., copying and/or preserving changed blocks).

The file may include any of a variety of types of files. In some examples, the file may include a virtual disk file. As used herein, the phrase "virtual disk file" may refer to any file and/or image containing data stored for the use of a virtual machine. In some examples, the data as stored within the virtual disk image may reflect the raw contents and/or structure of a virtual storage device. In one example, the phrase "virtual disk file" may refer to a VMWARE VIRTUAL MACHINE DISK file (a "VMDK file"). As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

FIG. 4 illustrates an exemplary system 400 for creating selective snapshots. As shown in FIG. 4, system 400 may include a virtual disk image 420 (e.g., as stored on a host file system of a virtual machine). A volume 410 may represent a logical view of the contents of virtual disk image 420 from the perspective of a guest operating system of a virtual machine that uses virtual disk image 420 as a virtual storage device. Using FIG. 4 as an example, at step 302 snapshot module 104 may determine that a snapshot has been taken of a volume of data that includes virtual disk image 420.

Returning to step 302, in some examples, the file may include a database file. The database file may include data in any suitable format. For example, the database file may store data for a relational database. In some examples, the database file may include one or more database tables.

Snapshot module 104 may determine that the snapshot has been taken in any of a variety of ways. For example, snapshot module 104 may receive a message indicating that the snapshot has been taken. Additionally or alternatively, snapshot module 104 may identify a log entry indicating that the snapshot has been taken. In some examples, snapshot module 104 may identify a schedule indicating when the snapshot is to be taken. Additionally or alternatively, snapshot module 104 may operate as a part of a system that takes the snapshot.

Returning to FIG. 3, at step 304 one or more of the systems described herein may identify a first attempted modification to a first block of the file. For example, at step 304 identification module 106 may, as part of computing device 202 in FIG. 2, identify attempt 252 to modify block 224 of file 222.

As used herein, the term "block" may refer to any discrete unit of data. In some examples, the term "block" may refer to a fixed-size unit of data within a file. For example, the term "block" may refer to a block and/or sector. In some examples, the term "block" may refer to a contiguous data region within a file. For example, the term "block" may refer to an extent.

Identification module 106 may identify the first attempted modification in any of a variety of contexts. For example, identification module 106 may operate as a part of a snapshot system creating the snapshot. In this example, identification module 106 may intercept write attempts to the volume. Additionally or alternatively, identification module 106 may operate as a part of and/or receive messages from a filter driver that intercepts write attempts. The first attempted modification may include any of a variety of types of modification, including an attempt to change the content of the block and/or an attempt to delete the block and/or deallocate the block from the file.

As mentioned earlier, in some examples the file may include a virtual disk file. Using FIG. 4 as an example, at step 304 identification module 106 may identify an attempt to modify a block 422 of virtual disk image 420.

Returning to FIG. 3, at step 306 one or more of the systems described herein may determine, based on a block map of the file, that the first block falls within a scope of the snapshot. For example, at step 306 determination module 108 may, as part of computing device 202 in FIG. 2, determine, based on block map 240 of file 222, that block 224 of file 222 falls within the scope of snapshot 230.

As used herein, the phrase "scope of the snapshot" generally refers to whether or not data is subject to one or more snapshot operations. For example, a block of data that falls "within the scope of the snapshot" may be subject to a copy-on-write operation and/or may be stored as a part of the snapshot. Likewise, a block of data that does not fall "within the scope of the snapshot" may not be subject to a copy-on-write operation and/or may not be stored as a part of the snapshot. Accordingly, the phrase "block map" may refer to any data structure and/or function that effectively delineates the scope of the snapshot. Examples of a "block map" include, without limitation, a bitmap, a list, and a surjective function. In some examples, the block map may only list and/or refer to blocks that do fall within the scope of the snapshot. Additionally or alternatively, the block map may only list and/or refer to blocks that do not fall within the scope of the snapshot. In some examples, the block map may list and/or refer to all blocks within the file and/or within the volume.

The block map may be defined and/or generated in any suitable manner. For example, a mapping module 210 may, as a part of computing device 202 in FIG. 2, generate block map 240. Mapping module 210 may generate the block map in any of a variety of ways. For example, as mentioned earlier, the file may include a virtual disk file. In this example, mapping module 210 may identify a plurality of in-scope files stored within the virtual disk file that fall within the scope of the snapshot. Mapping module 210 may identify the plurality of in-scope files in any suitable manner. For example, mapping module 210 may identify a user-defined list of files that are stored within a file system of a guest operating system that uses the virtual disk file for virtual storage. Additionally or alternatively, mapping module 210 may refer to a template based on the guest operating system that distinguishes files that are functionally relevant and/or important for the statefulness of one or more applications that run within the guest operating system. In some examples, mapping module 210 may create a list of files separating temporary files and/or swap files from other files within the file system of the guest operating system. In one example, mapping module 210 may operate as and/or communicate with an agent running within the guest operating system to retrieve information about the files within the guest operating system. In some examples, mapping module 210 may identify the plurality of in-scope files implicitly by identifying all files stored within the virtual disk file that are not included within the plurality of in-scope files.

After identifying the plurality of in-scope files stored within the virtual disk file that fall within the scope of the snapshot, mapping module 210 may identify a plurality of in-scope blocks of the virtual disk file corresponding to the plurality of in-scope files. For example, mapping module 210 may, for each in-scope file within the plurality of in-scope files, locate, within the virtual disk file, an inode corresponding to the in-scope file. Mapping module 210 may then identify each block referenced by the inode. For example, mapping module 210 may traverse a pointer structure of the inode to identify the location of each block referenced by the inode. As used herein, the term "inode" may refer to any metadata structure used for locating blocks of a file within a file system.

Figure 5:
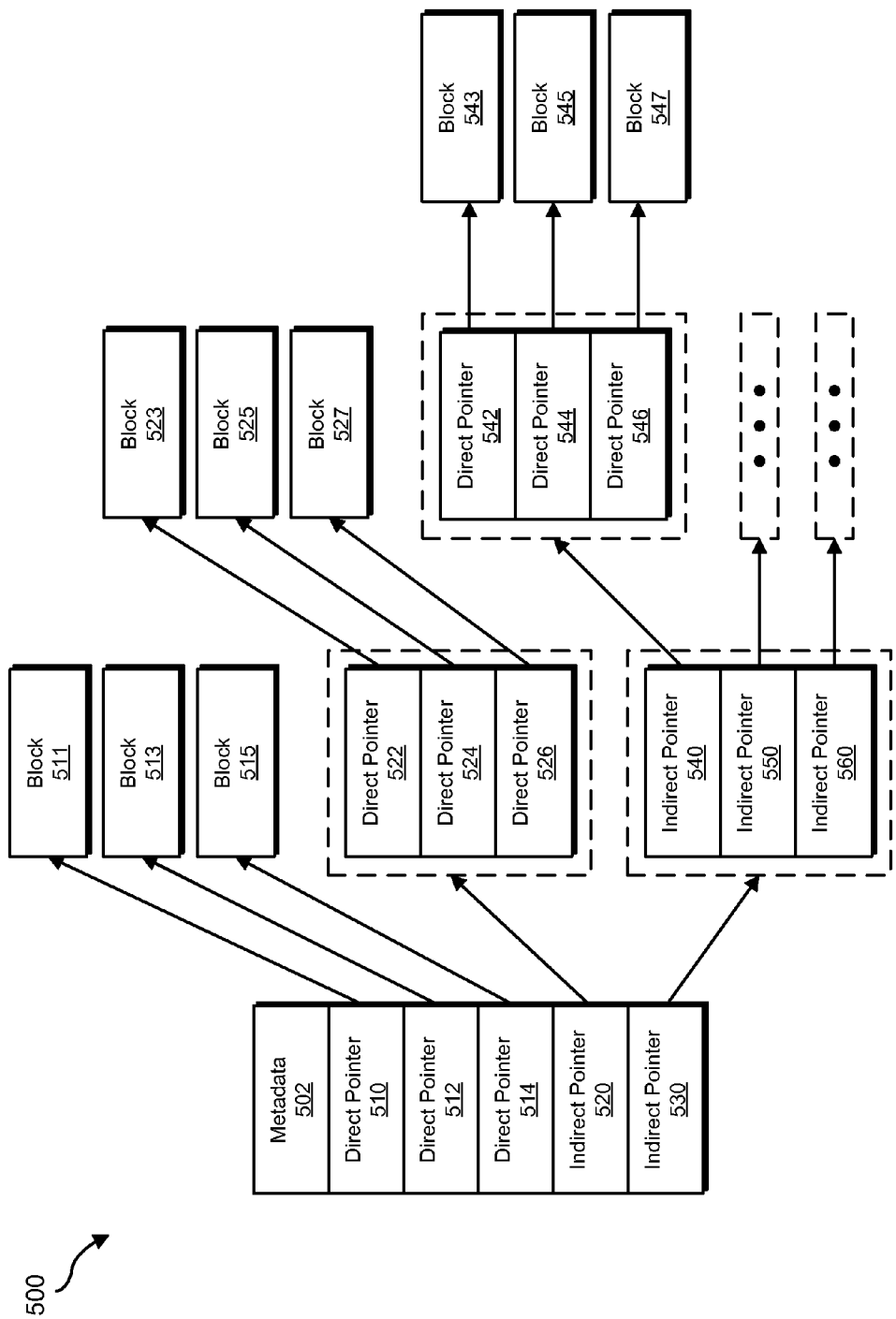
FIG. 5 is a block diagram of an exemplary inode structure used for creating selective snapshots.

FIG. 5 illustrates an exemplary inode 500. As shown in FIG. 5, inode 500 may include metadata 502, direct pointers 510, 512, and 514, and indirect pointers 520 and 530. Direct pointers of an inode may provide locations of blocks of data within a storage device. Indirect pointers of an inode may provide locations of direct pointers and/or other indirect pointers within a storage device. Accordingly, direct pointers 510, 512, and 514 may provide the locations of blocks 511, 513, and 515, respectively. Indirect pointer 520 may provide the location of direct pointers 522, 524, and 526, which may, in turn, provide the locations of blocks 523, 525, and 527, respectively. Indirect pointer 530 may provide the locations of indirect pointers 540, 550, and 560. Indirect pointer 540 may provide the location of direct pointers 542, 544, and 546, which may, in turn, provide the locations of blocks 543, 545, and 547, respectively. Accordingly, by identifying inode 500 (e.g., corresponding to the in-scope file), mapping module 210 may identify the locations of blocks 511, 513, 515, 523, 525, 527, 543, 545, and 547 as locations of in-scope blocks.

After identifying the plurality of in-scope blocks of the in-scope file, mapping module 210 may modify the block map to reflect that the plurality of in-scope blocks fall within the scope of the snapshot. For example, mapping module 210 may modify the block map of the file to mark the locations of the in-scope blocks of the in-scope file as within the scope of the snapshot. Mapping module 210 may translate the locations of the in-scope blocks of the in-scope file as recorded in the inode of the file system of the guest operating system (e.g., an ext3 file system) into locations of the in-scope blocks within the virtual disk file on the host operating system in any suitable manner. In some examples, a block number recorded in the inode may correspond directly to an offset of the virtual disk file. Additionally or alternatively, mapping module 210 may use a simple function to translate the block number to an offset of the virtual disk file (e.g., with the addition of an initial offset to the block number, a multiplier to the block number, etc.).

Using FIG. 4 as an example, volume 410 (e.g., of a guest operating system running within a virtual machine) may include files 412, 414, 416, and an unallocated space 418. Files 412 and 416 may fall within a snapshot scope 430. File 414 may fall outside snapshot scope 430. For example, file 414 may represent a temporary file, a swap file, and/or any other file within a virtual machine not requiring protection. Block 422 of virtual disk image 420 may correspond to a portion of file 412 within volume 410. Accordingly, the block map may indicate that block 422 is within snapshot scope 430. Likewise, block 426 of virtual disk image 420 may correspond to a portion of file 416 within volume 410, and so the block map may indicate that block 426 is within snapshot scope 430. However, block 424 of virtual disk image 420 may correspond to a portion of file 414 within volume 410. Accordingly, the block map may indicate that block 424 is not within snapshot scope 430. Likewise, block 428 of virtual disk image 420 may fall within unallocated space 418 of volume 410. Accordingly, the block map may indicate that block 428 is not within snapshot scope 430.

In some examples, the block map may be user-specified. For example, mapping module 210 may receive a list of blocks and/or extents identified by an administrator as unimportant and/or falling outside the scope of the snapshot.

Returning to step 306, as mentioned earlier, in some examples the file may include a database file. In these examples, determination module 108 may determine that the first block falls within the scope of the snapshot by determining, based on the block map of the file, that the first block represents a portion of a database table that falls within the scope of the snapshot. As used herein, the phrase "database table" may refer to any set of related data elements within a database. Determination module 108 may determine that the first block falls within the scope of the snapshot in any suitable manner. For example, determination module 108 may identify a list of tables that fall within the scope of the snapshot (e.g., a list submitted by an administrator). Determination module 108 may then query a database system with each table in the list of tables for one or more database file extents corresponding to the table. Determination module 108 may then check the first block against the database file extent to determine that the first block falls within and/or matches the extent.

Returning to FIG. 3, at step 308 one or more of the systems described herein may, in response to determining that the first block falls within the scope of the snapshot, copy the first block before the first attempted modification for use in the snapshot. For example, at step 308 copying module 110 may, as part of computing device 202 in FIG. 2, copy block 224 for use in snapshot 230 before allowing attempt 252 to modify block 224.

Copying module 110 may perform step 308 in any suitable manner. For example, copying module 110 may copy the first block for the snapshot and then allow the first attempted modification to proceed (e.g., by propagating and/or replicating the first attempted modification). For example, copying module 110 may operate as a part of a filter driver.

Returning to FIG. 3, at step 310 one or more of the systems described herein may identify a second attempted modification to a second block of the file. For example, at step 310 identification module 106 may, as part of computing device 202 in FIG. 2, identify attempt 254 to modify block 226 of file 222.

Identification module 106 may identify the second attempted modification in any of a variety of contexts. For example, identification module 106 may operate as a part of a snapshot system creating the snapshot. In this example, identification module 106 may intercept write attempts to the volume. Additionally or alternatively, identification module 106 may operate as a part of and/or receive messages from a filter driver that intercepts write attempts. The second attempted modification may include any of a variety of types of modification, including an attempt to change the content of the second block and/or an attempt to delete the second block and/or deallocate the second block from the file.

As mentioned earlier, in some examples the file may include a virtual disk file. Using FIG. 4 as an example, at step 310 identification module 106 may identify an attempt to modify a block 424 of virtual disk image 420.

Returning to FIG. 3, at step 312 one or more of the systems described herein may determine, based on the block map of the file, that the second block does not fall within the scope of the snapshot. For example, at step 312 determination module 108 may, as part of computing device 202 in FIG. 2, determine, based on block map 240 of file 222, that block 226 does not fall within the scope of snapshot 230.

Determination module 108 may determine that the second block does not fall within the scope of the snapshot based on the block map of the file in any suitable manner. For example, the block map may list blocks that fall within the scope of the snapshot and determination module 108 may determine that the second block is not listed within the block map. Alternatively, the block map may list blocks that do not fall within the scope of the snapshot and determination module 108 may determine that the second block is within the block map. In some examples, the block map may include a function that maps the second block to an indicator that the second block does not fall within the scope of the snapshot. Generally, determination module 108 may determine that the second block does not fall within the scope of the snapshot using a complement of any of the techniques and/or methods for determining that the first block does fall within the scope of the snapshot.

As mentioned earlier, in some examples the file may include a virtual disk file. In these examples, determination module 108 may determine that the second block does not fall within the scope of the snapshot by determining, based on the block map of the file, that the second block represents an unallocated block within the virtual disk file. Additionally or alternatively, determination module 108 may determine that the second block does not fall within the scope of the snapshot by determining, based on the block map of the file, that the second block represents a block within a temporary file within the virtual disk file. As used herein, the phrase "temporary file" may refer to any file used for storing transitory state information that is generally only used in the context of a transaction in process and/or a file used for storing data treated as volatile. In some examples, determination module 108 may determine that the second block does not fall within the scope of the snapshot by determining, based on the block map of the file, that the second block represents a block within a swap file within the virtual disk file.

Returning to FIG. 3, at step 314 one or more of the systems described herein may, in response to determining that the second block does not fall within the scope of the snapshot, allow the second attempted modification without first copying the second block for use in the snapshot. For example, at step 314 copying module 110 may, as part of computing device 202 in FIG. 2, allow attempt 254 to change block 226 without first copying block 226 for use in snapshot 230.

Copying module 110 may perform step 314 in any suitable manner. For example, copying module 110 may perform the second attempted modification on the second block. Additionally or alternatively, copying module 110 may transmit an instruction (e.g., to a filter driver) to allow the second attempted modification to proceed. In some examples, the second block may not be copied for the snapshot either by copying module 110 or by any other module and/or system.

As explained above, by determining which portions of files are important (e.g., the semantically and/or logically important portions of the files) and only preserving those portions of the files in snapshots, the systems and methods described herein may improve the efficiency of snapshots by avoiding unnecessary I/O operations and storage consumption. Furthermore, in some examples, these systems and methods may improve the efficiency of subsequent operations based on the snapshot, such as backups, restorations, and replications, by providing a smaller snapshot to backup, restore, and/or replicate.

Figure 6:
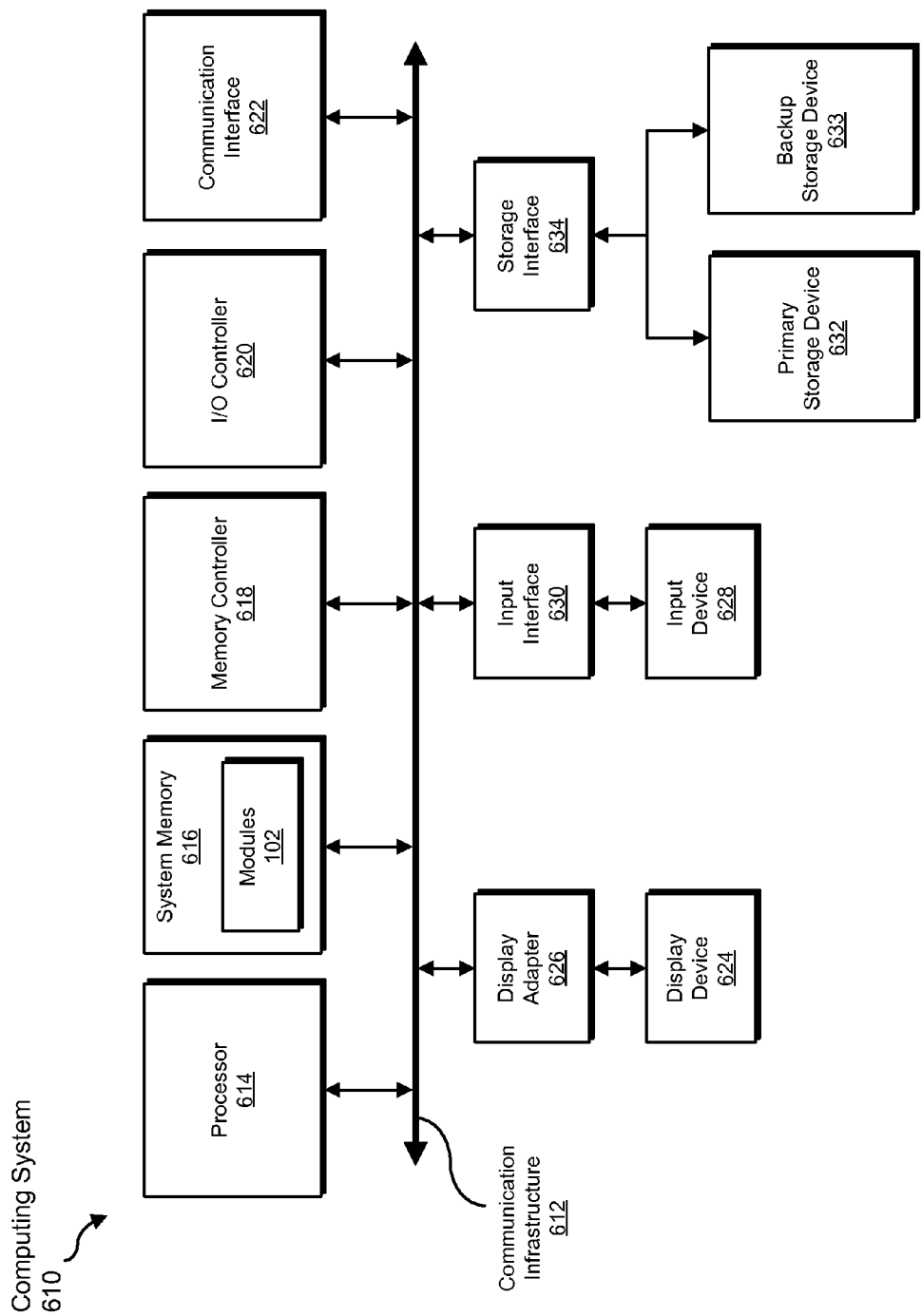
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the determining, identifying, modifying, locating, and/or copying steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
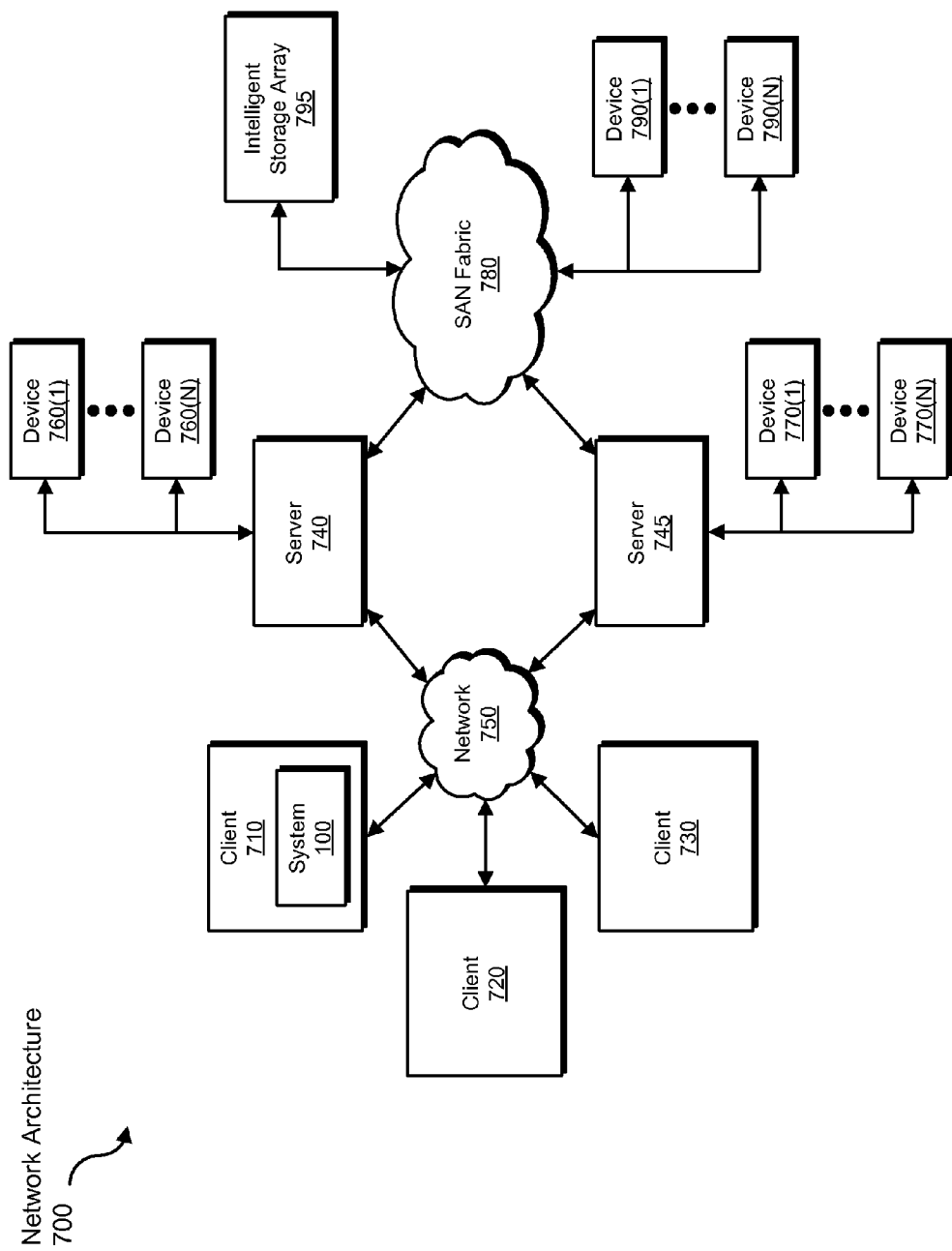
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the determining, identifying, modifying, locating, and/or copying steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of exemplary system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for creating selective snapshots.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for creating selective snapshots.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating selective snapshots, at least a portion of the method being performed by a computing device comprising at least one processor, the method comprising:
   determining that a snapshot has been taken of a volume of data, the volume of data comprising at least one file;
   identifying a first attempted modification to a first block of the file;
   determining, based on a block map of the file, that the first block falls within a scope of the snapshot;
   in response to determining that the first block falls within the scope of the snapshot, copying the first block before the first attempted modification for use in the snapshot;
   identifying a second attempted modification to a second block of the file;
   determining, based on the block map of the file, that the second block does not fall within the scope of the snapshot;
   in response to determining that the second block does not fall within the scope of the snapshot, allowing the second attempted modification without first copying the second block for use in the snapshot.

2. The computer-implemented method of claim 1, wherein the file comprises a virtual disk file.

3. The computer-implemented method of claim 2, wherein determining, based on the block map of the file, that the second block does not fall within the scope of the snapshot comprises determining, based on the block map of the file, that the second block represents an unallocated block within the virtual disk file.

4. The computer-implemented method of claim 2, wherein determining, based on the block map of the file, that the second block does not fall within the scope of the snapshot comprises determining, based on the block map of the file, that the second block represents a block within a temporary file within the virtual disk file.

5. The computer-implemented method of claim 2, further comprising:
   identifying a plurality of in-scope files stored within the virtual disk file that fall within the scope of the snapshot;
   identifying a plurality of in-scope blocks of the virtual disk file corresponding to the plurality of in-scope files;
   modifying the block map to reflect that the plurality of in-scope blocks fall within the scope of the snapshot.

6. The computer-implemented method of claim 5, wherein identifying the plurality of in-scope blocks corresponding to the plurality of in-scope files comprises:
   for each in-scope file within the plurality of in-scope files:
      locating, within the virtual disk file, an inode corresponding to the in-scope file;
      identifying each block referenced by the inode.

7. The computer-implemented method of claim 1, wherein the file comprises a database file.

8. The computer-implemented method of claim 7, wherein determining, based on the block map of the file, that the first block falls within the scope of the snapshot comprises determining, based on the block map of the file, that the first block represents a portion of a database table that falls within the scope of the snapshot.

9. A system for creating selective snapshots, the system comprising:
   a snapshot module programmed to determine that a snapshot has been taken of a volume of data, the volume of data comprising at least one file;
   an identification module programmed to:
      identify a first attempted modification to a first block of the file;
      identify a second attempted modification to a second block of the file;
   a determination module programmed to:
      determine, based on a block map of the file, that the first block falls within a scope of the snapshot;
      determine, based on the block map of the file, that the second block does not fall within the scope of the snapshot;
   a copying module programmed to:
      in response to determining that the first block falls within the scope of the snapshot, copy the first block before the first attempted modification for use in the snapshot;
      in response to determining that the second block does not fall within the scope of the snapshot, allow the second attempted modification without first copying the second block for use in the snapshot;
   at least one processor configured to execute the snapshot module, the identification module, the determination module, and the copying module.

10. The system of claim 9, wherein the file comprises a virtual disk file.

11. The system of claim 10, wherein the determination module is programmed to determine, based on the block map of the file, that the second block does not fall within the scope of the snapshot by determining, based on the block map of the file, that the second block represents an unallocated block within the virtual disk file.

12. The system of claim 10, wherein the determination module is programmed to determine, based on the block map of the file, that the second block does not fall within the scope of the snapshot by determining, based on the block map of the file, that the second block represents a block within a temporary file within the virtual disk file.

13. The system of claim 10, further comprising a mapping module programmed to:
   identify a plurality of in-scope files stored within the virtual disk file that fall within the scope of the snapshot;
   identify a plurality of in-scope blocks of the virtual disk file corresponding to the plurality of in-scope files;
   modify the block map to reflect that the plurality of in-scope blocks fall within the scope of the snapshot.

14. The system of claim 13, wherein the mapping module is programmed to identify the plurality of in-scope blocks corresponding to the plurality of in-scope files by:
   for each in-scope file within the plurality of in-scope files:
      locating, within the virtual disk file, an inode corresponding to the in-scope file;
      identifying each block referenced by the inode.

15. The system of claim 9, wherein the file comprises a database file.

16. The system of claim 15, wherein the determination module is programmed to determine, based on the block map of the file, that the first block falls within the scope of the snapshot by determining, based on the block map of the file, that the first block represents a portion of a database table that falls within the scope of the snapshot.

17. A non-transitory computer-readable-storage medium comprising one or more computer-executable instructions that, when executed by at least one processor of a computing device, cause the computing device to:
   determine that a snapshot has been taken of a volume of data, the volume of data comprising at least one file;
   identify a first attempted modification to a first block of the file;
   determine, based on a block map of the file, that the first block falls within a scope of the snapshot;
   in response to determining that the first block falls within the scope of the snapshot, copy the first block before the first attempted modification for use in the snapshot;
   identify a second attempted modification to a second block of the file;
   determine, based on the block map of the file, that the second block does not fall within the scope of the snapshot;
   in response to determining that the second block does not fall within the scope of the snapshot, allow the second attempted modification without first copying the second block for use in the snapshot.

18. The computer-readable-storage medium of claim 17, wherein the file comprises a virtual disk file.

19. The computer-readable-storage medium of claim 18, wherein the one or more computer-executable instructions cause the computing device to determine, based on the block map of the file, that the second block does not fall within the scope of the snapshot by causing the computing device to determine, based on the block map of the file, that the second block represents an unallocated block within the virtual disk file.

20. The computer-readable-storage medium of claim 18, wherein the one or more computer-executable instructions cause the computing device to determine, based on the block map of the file, that the second block does not fall within the scope of the snapshot by causing the computing device to determine, based on the block map of the file, that the second block represents a block within a temporary file within the virtual disk file.

* * * * *